(12) United States Patent
Zampetis et al.

(10) Patent No.: US 8,607,496 B2
(45) Date of Patent: Dec. 17, 2013

(54) MECHANICAL SCRAPE MAKING DEVICE

(75) Inventors: Constantine Zampetis, Brunswick, OH (US); James Walther, Chatham, OH (US); Thomas Goad, Grafton, OH (US)

(73) Assignee: Chatham Outdoors, LLC, Chatham, OH (US)

( * ) Notice: Subject to any disclaimer, the term of this patent is extended or adjusted under 35 U.S.C. 154(b) by 775 days.

(21) Appl. No.: 12/202,637

(22) Filed: Sep. 2, 2008

(65) Prior Publication Data

US 2010/0050494 A1 Mar. 4, 2010

(51) Int. Cl.
*A01M 31/00* (2006.01)
*A01M 31/06* (2006.01)

(52) U.S. Cl.
USPC .................................. 43/1; 43/2; 239/289

(58) Field of Classification Search
USPC .............. 43/1, 2; 239/289; 111/110; 405/269
See application file for complete search history.

(56) References Cited

U.S. PATENT DOCUMENTS

| | | | | |
|---|---|---|---|---|
| 1,264,556 A | * | 4/1918 | Postel | 239/289 |
| 1,314,276 A | * | 8/1919 | Leland | 43/2 |
| 1,568,448 A | * | 1/1926 | Freeman | 239/289 |
| 1,643,846 A | * | 9/1927 | Hale | 239/289 |
| 2,334,598 A | * | 11/1943 | Bateman et al. | 111/110 |
| 2,532,251 A | * | 11/1950 | Whitmire et al. | 239/289 |
| 2,559,183 A | * | 7/1951 | Barnett | 111/110 |
| 2,610,563 A | * | 9/1952 | Lambson | 111/110 |
| 2,637,263 A | * | 5/1953 | Schmitz | 111/110 |
| 2,638,730 A | * | 5/1953 | Davidson | 56/400.14 |
| 2,731,928 A | * | 1/1956 | Jackson | 111/110 |
| 2,796,011 A | * | 6/1957 | Schmidt | 239/289 |
| 2,859,718 A | * | 11/1958 | Barkley | 111/110 |
| 2,878,633 A | * | 3/1959 | Mullin | 56/16.8 |
| 2,888,890 A | * | 6/1959 | Baptista | 111/110 |
| 2,939,636 A | * | 6/1960 | Mullin | 239/214.21 |
| 3,090,187 A | * | 5/1963 | Livingston | 56/295 |
| 3,332,221 A | * | 7/1967 | McCain | 56/295 |
| 3,942,308 A | * | 3/1976 | Vicendese et al. | 56/16.8 |
| 4,091,751 A | * | 5/1978 | Dri et al. | 111/110 |
| 4,186,502 A | * | 2/1980 | Foster | 43/1 |
| 4,610,641 A | * | 9/1986 | Allen | 446/397 |
| 4,616,578 A | * | 10/1986 | Talbott | 111/110 |
| 4,644,880 A | * | 2/1987 | Branch | 111/110 |

(Continued)

OTHER PUBLICATIONS

Whitetail Innovators—Scrape Maker, http://scrapemaker.com.

(Continued)

*Primary Examiner* — Darren W Ark
(74) *Attorney, Agent, or Firm* — Emerson Thomson Bennett, LLC (57) ABSTRACT

A programmable, mechanical scrape making device that is battery operated and that can be fastened to the ground. When activated, the device comes in contact with the ground to create a scrape through a sweeping and/or linear motion that is the same as or similar to that of an actual scrape that is performed by deer during the Rut or breeding season. The device also has a scent spraying mechanism that operates as the scrape is made. The device can be enclosed and operate from a weatherproof case which may be designed to look like a tree log. The design of the case can vary in appearance as to create a look that is indigenous to the end users' geographic area. The device is portable and may include a carrying case with a shoulder strap allowing the end user to transport the device from one location to another. The device may include power ports accessible for other devices such as motion detecting digital cameras and mock licking branches.

11 Claims, 4 Drawing Sheets

(56) References Cited

U.S. PATENT DOCUMENTS

| | | | | |
|---|---|---|---|---|
| 4,660,479 A * | 4/1987 | Crisio et al. | | 111/110 |
| 4,667,430 A * | 5/1987 | Ziese, Jr. | | 43/1 |
| 4,682,715 A * | 7/1987 | Reeves | | 43/1 |
| 4,722,477 A * | 2/1988 | Floyd | | 43/1 |
| 4,735,010 A * | 4/1988 | Grinarml | | 43/1 |
| 4,769,931 A * | 9/1988 | Morrow et al. | | 36/134 |
| 4,773,177 A * | 9/1988 | Gray et al. | | 43/1 |
| 4,813,604 A * | 3/1989 | Curran, Jr. | | 239/163 |
| 4,821,959 A * | 4/1989 | Browing | | 239/121 |
| 4,850,928 A * | 7/1989 | Stewart | | 446/397 |
| 4,887,384 A * | 12/1989 | Reyne | | 47/1.5 |
| 4,919,059 A * | 4/1990 | Windle | | 111/110 |
| 4,926,622 A * | 5/1990 | McKee | | 56/16.8 |
| 4,953,763 A * | 9/1990 | Kierum et al. | | 43/1 |
| 5,024,008 A * | 6/1991 | Maples | | 36/136 |
| 5,029,408 A * | 7/1991 | Smith | | 43/1 |
| 5,074,439 A * | 12/1991 | Wilcox | | 43/1 |
| 5,148,621 A * | 9/1992 | Rosen | | 43/1 |
| 5,148,949 A * | 9/1992 | Luca | | 43/1 |
| 5,195,308 A * | 3/1993 | Grote et al. | | 56/16.4 R |
| 5,220,741 A * | 6/1993 | Burgeson | | 43/1 |
| 5,279,062 A * | 1/1994 | Burgeson | | 43/1 |
| 5,299,376 A * | 4/1994 | Roberts | | 43/2 |
| 5,312,044 A * | 5/1994 | Eaton | | 239/289 |
| 5,327,667 A * | 7/1994 | Fore | | 43/1 |
| 5,335,438 A * | 8/1994 | Terrill | | 43/1 |
| 5,361,527 A * | 11/1994 | Burgeson | | 43/1 |
| 5,461,814 A * | 10/1995 | Reid et al. | | 43/1 |
| 5,515,623 A * | 5/1996 | Weeks | | 239/289 |
| 5,533,676 A * | 7/1996 | Conley | | 239/289 |
| 5,555,663 A * | 9/1996 | Burgeson | | 43/1 |
| 5,555,665 A * | 9/1996 | Fore | | 43/1 |
| 5,822,968 A * | 10/1998 | Savala | | 239/289 |
| 5,884,427 A * | 3/1999 | Lenz | | 43/2 |
| 5,970,643 A * | 10/1999 | Gawel, Jr. | | 43/1 |
| 5,971,208 A * | 10/1999 | Kennedy | | 43/1 |
| 6,038,804 A * | 3/2000 | Cuerrier | | 43/1 |
| 6,050,016 A * | 4/2000 | Cox | | 43/1 |
| 6,209,252 B1 * | 4/2001 | McGough | | 43/1 |
| 6,289,626 B1 * | 9/2001 | Williams | | 43/2 |
| 6,398,126 B1 * | 6/2002 | Pitchford | | 239/36 |
| 6,443,434 B1 * | 9/2002 | Prather | | 43/1 |
| 6,510,644 B1 * | 1/2003 | Gollnik | | 43/2 |
| 6,742,723 B2 * | 6/2004 | Felegy | | 43/1 |
| 6,857,214 B1 * | 2/2005 | Pelissier | | 43/1 |
| 6,889,466 B1 * | 5/2005 | Hamlet | | 43/2 |
| 6,901,693 B1 * | 6/2005 | Crowe | | 43/2 |
| 6,953,164 B2 * | 10/2005 | Duncan et al. | | 239/289 |
| 7,043,890 B2 * | 5/2006 | Lofton | | 56/16.8 |
| 7,065,944 B1 * | 6/2006 | Steele | | 239/289 |
| 7,093,770 B1 * | 8/2006 | Moran | | 239/36 |
| 7,108,199 B1 * | 9/2006 | Brown | | 43/1 |
| 7,441,365 B2 * | 10/2008 | Brunner et al. | | 43/2 |
| D595,936 S * | 7/2009 | Love | | D2/895 |
| 7,681,385 B2 * | 3/2010 | Labar et al. | | 56/16.8 |
| 7,690,540 B1 * | 4/2010 | Owens | | 43/1 |
| 7,699,240 B2 * | 4/2010 | Eaton | | 239/289 |
| 8,181,826 B2 * | 5/2012 | Wainwright | | 43/2 |
| 8,387,301 B2 * | 3/2013 | Williams, Sr. | | 43/2 |
| 8,510,984 B2 * | 8/2013 | Burgeson | | 43/1 |
| 2005/0189433 A1 * | 9/2005 | Burgeson | | 239/44 |
| 2005/0189434 A1 * | 9/2005 | Burgeson | | 239/44 |
| 2007/0095941 A1 * | 5/2007 | Gorres | | 239/34 |
| 2007/0226914 A1 * | 10/2007 | Satayana | | 7/158 |
| 2007/0256260 A1 * | 11/2007 | Bretzke, Jr. | | 15/105 |
| 2008/0054021 A1 * | 3/2008 | Brown et al. | | 222/175 |
| 2008/0092426 A1 * | 4/2008 | Modlin et al. | | 43/1 |
| 2008/0099581 A1 * | 5/2008 | Modlin et al. | | 43/1 |
| 2009/0050711 A1 * | 2/2009 | Castner | | 43/1 |
| 2010/0063640 A1 * | 3/2010 | Olmstead | | 43/1 |
| 2010/0096409 A1 * | 4/2010 | Wainwright | | 43/1 |
| 2013/0152448 A1 * | 6/2013 | Ewert | | 43/2 |

OTHER PUBLICATIONS

Code Blue—Drop Time Scent Dispenser; www.codebluescents.com/productdetail.
Buck Bomb; www.buckbomb.com/buck_bomb_info.
Scent Dispenser; www.scentdispenser.com.
Moultrie—Scent Boss. www.moultriefeeders.com/catalog.
Wildlife Research Center—Scent Dispensers; www.wildlife.com.
Wizard Outdoor Products—Scent Wizard; www.wizardoutdoors.com/scent_dispenser.
Scent Shield Box—Scent Dispenser; www.cabelas.com.

* cited by examiner

MECHANICAL SCRAPE MAKING DEVICE

I. BACKGROUND

A. Field of Invention

This invention pertains to the art of methods and apparatuses regarding attracting wildlife and more specifically to methods and apparatuses regarding a mechanical device for creating a deer scrape.

B. Description of the Related Art

A scrape is a scent and a visual marker created when a deer, usually a buck, removes ground litter with its fore-hooves and exposes a patch of mineral soil. The scrape may be created under an overhang of tree branches and the deer may urinate in the exposed soil and rub their scent on the overhanging branches so that the scrape will act as a visual and scent "signpost" for other deer. A scrape is commonly created during the "Rut" or breeding season and is often visited regularly by multiple deer. Bucks may visit the scrapes regularly to determine what other deer may be in the area. Does may also visit the scrape. Does may mark the scrape with their urine. The scent of the doe's urine will tell a buck whether the doe is ready to breed.

What is needed is a device and method for creating or making a deer scrape that requires minimal or no human interaction to operate once the device is placed in its selected location.

II. SUMMARY

According to one embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground.

According to another embodiment of the invention, a scrape making device has a power supply, a motor, a pump, a scent dispenser, a rake, and a pump switch. The operation of the motor at least partially causes the rake to create a scrape across the ground and during the operation of the motor, the pump at least partially causes the scent dispenser to dispense a fluid onto the ground. Additionally, as the rake arm is in motion, the rake arm may mix the scent into the ground. The pump switch allows for the selective control of the duration and timing of the operation of the pump.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The rake includes a rake arm and a rake arm attachment. The movement of the rake arm at least partially causes the rake arm attachment to contact the ground to create the scrape. The movement of the rake arm may create the scrape by removing debris from the ground thereby creating a visual interaction with game animals.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The rake includes a rake arm, a rake arm attachment, and a rake arm stabilizer. The movement of the rake arm at least partially causes the rake arm attachment to contact the ground to create the scrape.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a scent applicator, wherein the scent applicator extends from the rake arm and is in fluid communication with the scent dispenser.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a timer, wherein the timer at least partially allows for the programmable operation of the scrape making device.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a casing, wherein the casing provides a substantially weatherproof enclosure for the scrape making device.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a casing and a vented fill tube. The casing provides a substantially weatherproof enclosure for the scrape making device. The vented fill tube at least partially allows the scent dispenser to be filled with the fluid while the scrape making device is substantially enclosed within the casing.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes an auxiliary port.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a base plate for providing a weatherproof foundation and support for the scrape making device.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a base plate and a ground stake access hole. The base plate provides a weatherproof foundation and support for the scrape making device. The ground stake access hole allows a stake to be used to fasten the scrape making device to the ground.

According to another embodiment of the invention, a scrape making device has a power supply, a motor, a pump, a scent dispenser, and a rake. The operation of the motor at least partially causes the rake to create a scrape across the ground and during the operation of the motor, the pump at least partially causes the scent dispenser to dispense a fluid onto the ground. The scrape making device further includes a base plate and a casing. The basing provides a weatherproof foundation and support for the scrape making device. The casing provides a substantially weatherproof enclosure for the scrape making device and is selectively attachable to the base plate.

According to one embodiment of the invention, a mechanical scrape making device includes an integrated power supply, a motor assembly, a pump assembly, a timer, a scent dispenser, a rake assembly, a base plate, and a casing. The motor assembly has a motor and a drive unit. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device.

According to another embodiment of the invention, a mechanical scrape making device includes an integrated power supply, a motor assembly, a pump assembly, a timer, a scent dispenser, a rake assembly, a base plate, and a casing. The integrated power supply is a battery. The motor assembly has a motor and a drive unit. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device. The mechanical scrape making device further includes an auxiliary port.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device. The mechanical scrape making device further includes a carrying strap and a pair of strap brackets. The carrying strap at least partially assists the user in transporting the scrape making device. The pair of strap brackets are for selectively attaching the carrying strap to the mechanical scrape making device.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit. The pump assembly has a pump and a reservoir. The timer allows for the programmed operation of the mechanical scrape making device at predetermined intervals over a predetermined period. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device. The mechanical scrape making device further includes a rake arm stabilizer.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit and at least partially causes the rake arm to move in a sweeping motion relative to the mechanical scrape making device. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device.

According to another embodiment of the invention, a mechanical scrape making device includes an integrated power supply, a motor assembly, a pump assembly, a timer, a scent dispenser, a rake assembly, a base plate, and a casing. The motor assembly has a motor and a drive unit and at least partially causes the rake arm to move in a linear motion relative to the mechanical scrape making device. The pump assembly has a pump and a reservoir. The timer allows for the programmed operation of the mechanical scrape making device. The scent dispenser has a conduit and a scent applicator. The rake assembly has a rake arm, a channel, and a plurality of rake arm attachments for contacting the ground to create a scrape. The base plate has a plurality of ground stake access holes. The casing is designed to at least partially camouflage the mechanical scrape making device and is selectively attachable to the base plate to substantially enclose the mechanical scrape making device.

One advantage of this invention is there is minimal or no human interaction required to operate the invention once the invention is placed in its selected location.

Another advantage of this invention is that is will allow the user to select a location for the device, establish an environment that is concealed, and use the device to create a scrape through a sweeping and/or linear motion that is substantially the same as an actual scrape created by a deer during the Rut.

Yet another advantage of this invention is that the device allows the user to control the number of scrapes made during a predetermined period of time. Additionally, the device can dispense and mix a scent into the ground with each scrape made as if the scrape has been visited by deer on multiple occasions.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DETAILED DESCRIPTION

Figure 1:
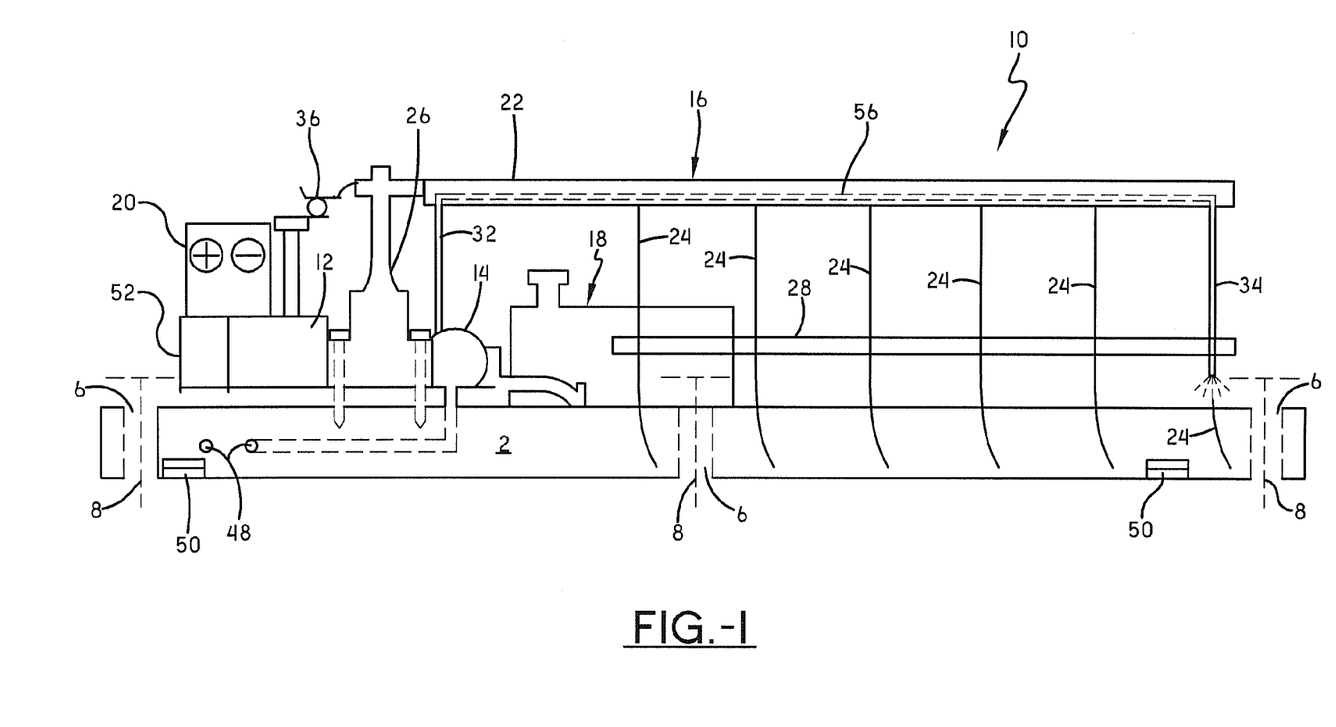
FIG. 1 shows an elevation view of the mechanical scrape making device according to one embodiment of the invention.

Referring now to the drawings wherein the showings are for purposes of illustrating embodiments of the invention only and not for purposes of limiting the same, FIG. 1 shows a mechanical scrape making device (MSMD) 10 according to one embodiment of the invention. The MSMD 10 may comprise a device for creating a visual marker or "scrape" that allows for the interaction with game, for example deer, by removing debris and mixing a scent into the ground. The MSMD 10 may be a mechanical device for creating a scrape comprising a power supply 20, a motor 12, a pump 14, a rake 16, and a scent dispenser 18. In one embodiment, the MSMD 10 may comprise a portable device that can be programmed to operate at predetermined intervals over a predetermined period.

With reference now to FIG. 1, the power supply 20 may comprise an integral power source for the MSMD 10. In one embodiment, the power supply 20 may comprise a replaceable battery. In another embodiment, the power supply 20 may comprise a 6V-12V DC power supply. The power supply 20 may comprise any type of power supply chosen with sound judgment by a person of ordinary skill in the art. In one embodiment, the power supply 20 may supply power to an accessory device, such as a digital camera or a licking branch accessory, via an auxiliary port 48. The auxiliary port 48 may be located on a base plate 2, described below, such that it may be conveniently accessed by the user. In another embodiment, the power supply 20 may provide power to a plurality of auxiliary ports 48.

Figure 2:
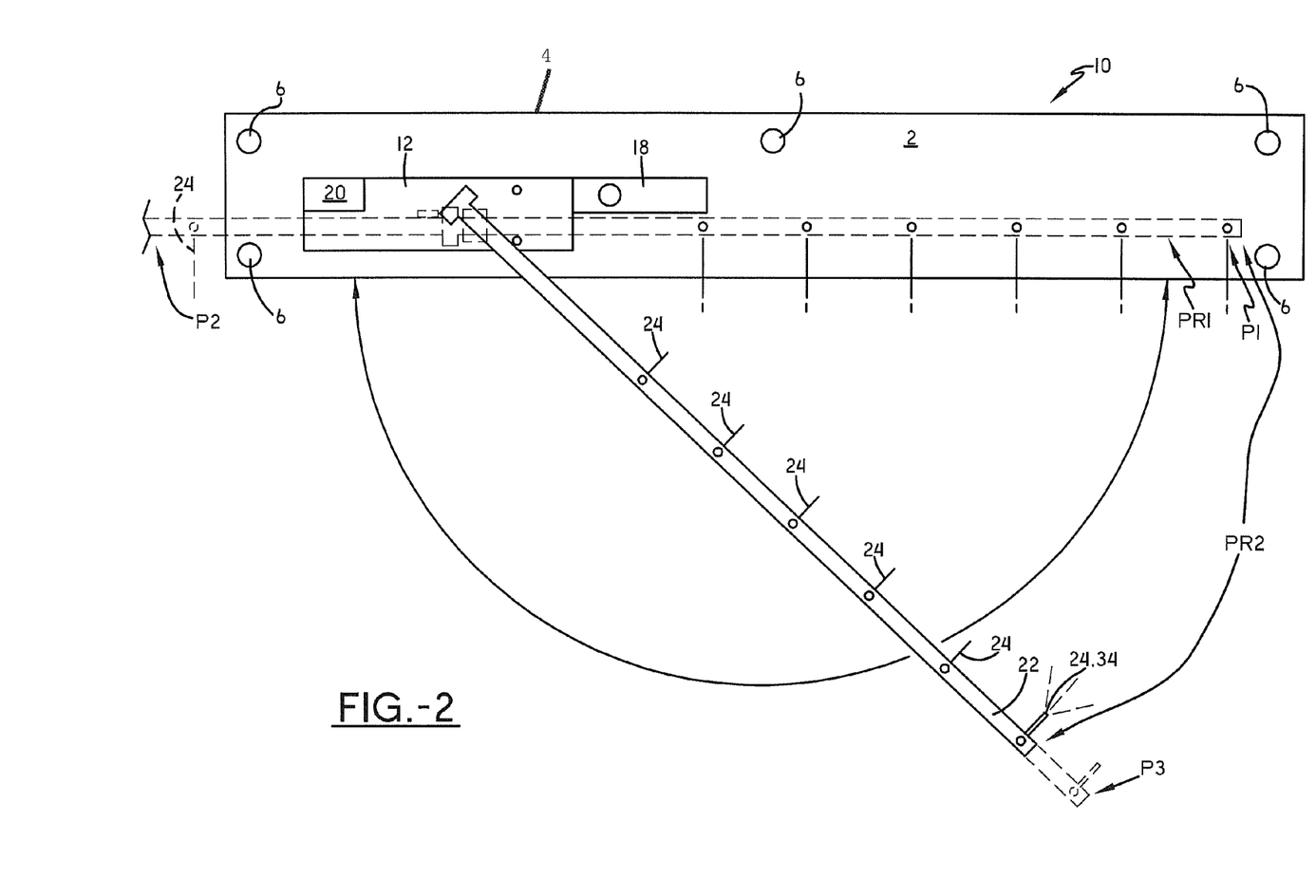
FIG. 2 shows a plan view of the mechanical scrap making device depicting the sweeping motion of the rake according to one embodiment of the invention.

With reference now to FIGS. 1 and 2, the MSMD 10 may comprise a motor 12. The motor 12 may be in electrical communication with the power supply 20. The power supply 20 may provide power to operate the motor 12. In one embodiment, the motor assembly 12 may comprise a 6V-12V DC prime mover. In another embodiment, the motor 12 may include a drive unit 26. The drive unit 26 may comprise a device for at least partially causing a sweeping or linear movement of the rake 16 as described more fully below.

With reference now to FIG. 1, the rake 16 may be operatively coupled to the motor 12 such that the operation of the motor 12 at least partially causes the movement of rake 16. The movement of the rake 16 may cause a scrape to be formed along the ground. In one embodiment, the rake 16 may comprise a rake arm 22 and a rake arm attachment 24. The rake arm 22 may comprise an elongated structure that is operatively coupled to the motor 12 at a first rake end 22a such that the operation of the motor 12 causes the movement of the rake arm 22. The rake arm attachment 24 may be attached to the rake arm 22 and may contact the ground to create the scrape during the movement of the rake arm 22. The rake arm attachment 24 may comprise a flexible tine that is selectively removable from the rake arm 22. In one embodiment, the rake 16 may comprise a plurality of rake arm attachments 24 positioned along the length of the rake arm 22. The plurality of rake arm attachments 24 may be interchangeable and selectively removable thereby allowing the user to alter or change the pattern of the scrape formed during operation of the MSMD 10. The rake 16 may additionally comprise a rake arm stabilizer 28. The rake arm stabilizer 28 may comprise an elongated structure that extends across the plurality of rake arm attachments 28. The rake arm stabilizer 28 may an adjustable horizontally mounted structure that allows the user to alter the flexibility of the rake arm attachment 24.

With reference to FIGS. 1 and 2, in one embodiment, the rake arm 22 may be operatively coupled to the drive unit 26. The drive unit 26 may be operatively coupled to the motor 12 and may at least partially translate the rotational movement of a drive shaft, not shown, of the motor 12 into the sweeping and/or linear movement of the rake arm 22. In one embodiment, the drive unit 26 may at least partially cause the rake arm 22 to move in a relatively sweeping motion. The sweeping motion of the rake arm 22 may cause the rake arm attachment 24 to move from an initial position P1 to a second position P2. The second position P2 may comprise a position that is about 180 degrees in relation to the initial position P1. In another embodiment, the second position P2 may comprise a position is a position that is between about 90 degrees and about 180 degrees in relation to the initial position P1. In yet another embodiment, the second position P2 may comprise a position that is about 135 degrees in relation to the initial position P1. The drive unit 26 may then at least partially cause the rake arm attachment 24 to move from the second position P2 to a first return position PR1. In one embodiment, the first return position PR1 may be substantially the same as the initial position P1. Additionally, the drive unit 26 and/or the motor 12 may be selectively adjustable to allow the user to alter the location of the second position P2 and/or the first return position PR1. In another embodiment, the drive unit 26 may at least partially cause the rake arm 22 to move in a relatively linear motion. The linear movement of the rake arm 22 may cause the rake arm attachment 24 to move from an initial position P1 away from the MSMD 10 to a third position P3. The drive unit 26 may then at least partially cause the rake arm attachment 24 to move from the third position P3 to a second return position PR2. In one embodiment, the second return position PR2 may be substantially the same as the first return position PR1 and/or the initial position P1.

Figure 4:
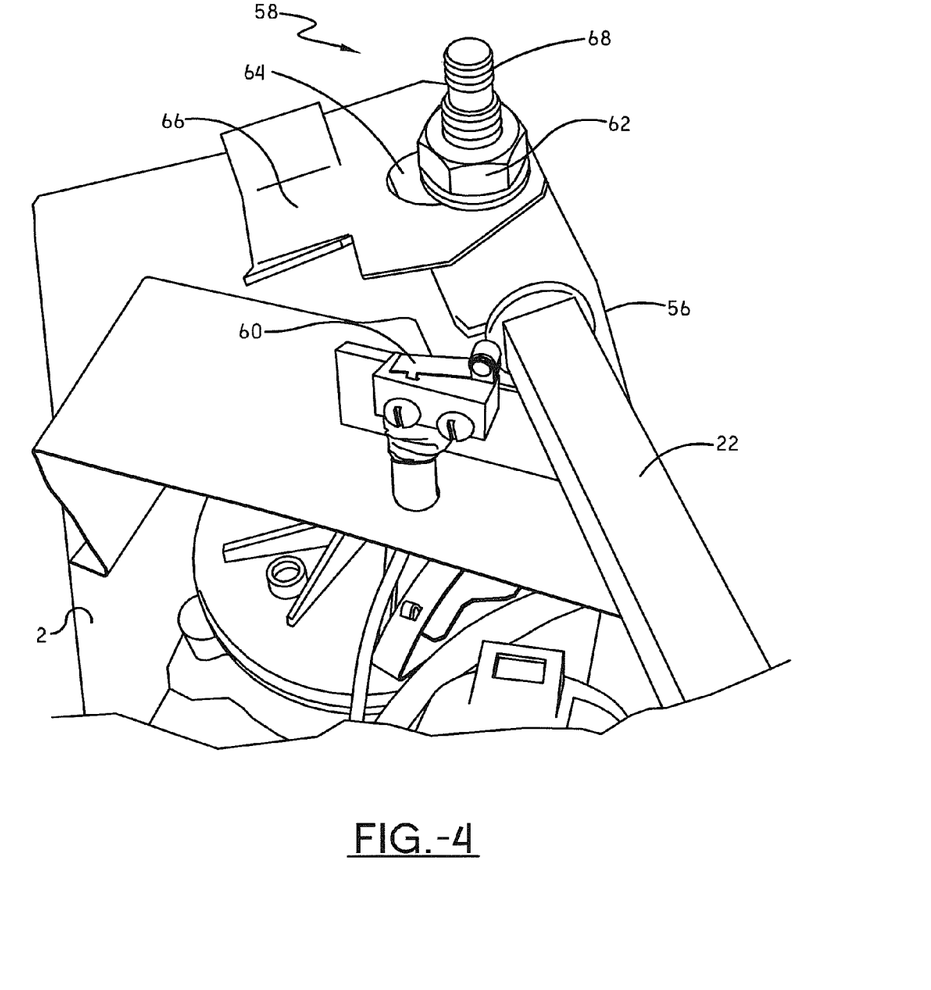
FIG. 4 shows a partial view of a mechanical scrape making device having a pump switch assembly according to one embodiment of the invention.

With reference now to FIGS. 1 and 4, the scent dispenser 18 may be operatively connected to the pump 14 wherein the operation of the pump 14 at least partially causes the scent dispenser 18 to dispense a deer scent, not shown, onto the ground. In one embodiment, the operation of the motor 12 may at least partially cause the operation of the pump 14 thereby causing the scent dispenser 18 to dispense a deer scent, not shown, onto the ground while the scrape is being created. In one embodiment, the pump 14 may comprise a pump switch assembly 36. The pump switch assembly 36 may be operatively connected to the motor 12 and may allow for the adjustment and control of the timing and duration of the dispensing of the deer scent relative to the movement of the rake arm 22. The pump switch assembly 36 may comprise a pump actuator 58, an actuator switch 60, and an adjustment means 62. The pump actuator 58 may be adjustably coupled to the end of the rake arm 22. The rotation of the rake arm 22 may cause the pump actuator 58 to contact or otherwise actuate the actuator switch 60 thereby causing the scent dispenser 18 to dispense the fluid. The pump actuator 58 may remain in contact with the actuator switch 60 for a predetermined period wherein the continued movement of the rake arm 22 subsequently causes the pump actuator 58 to move out of contact with the actuator switch 60. In one embodiment, the pump actuator 58 may comprise a pan 56 having a coupling aperture 64 and an actuator portion 66. The coupling aperture 64 may receive a bolt 68 or similar structure extending from the end of the rake arm 22. The actuator portion 66 may comprise an elongated portion that is able to be rotated into contact with the actuator switch 60 thereby causing the scent dispenser 18 to dispense a deer scent. The adjustment means 62 may comprise a jam nut 62 that can be screwed onto the bolt 68 thereby selectively coupling the pan 56 into a desired first position. In the first position, the rotation of the rake arm 22 may cause the scent dispenser 18 to dispense a first amount of scent at a first time and for a first duration. The operation of the scent dispenser 18 may be changed or adjusted by loosening the jam nut 62, rotating the pan 56 to a second position, and tightening the jam nut 62. The positioning of the pan 56 into the second position may allow the rotation of the rake arm 22 to cause the scent dispenser 18 to dispense a second amount of scent at a second time and for a second duration wherein the second amount of scent, the second time and the second duration are different than the first amount of scent, the first time, and the first duration respectively.

Figure 3:
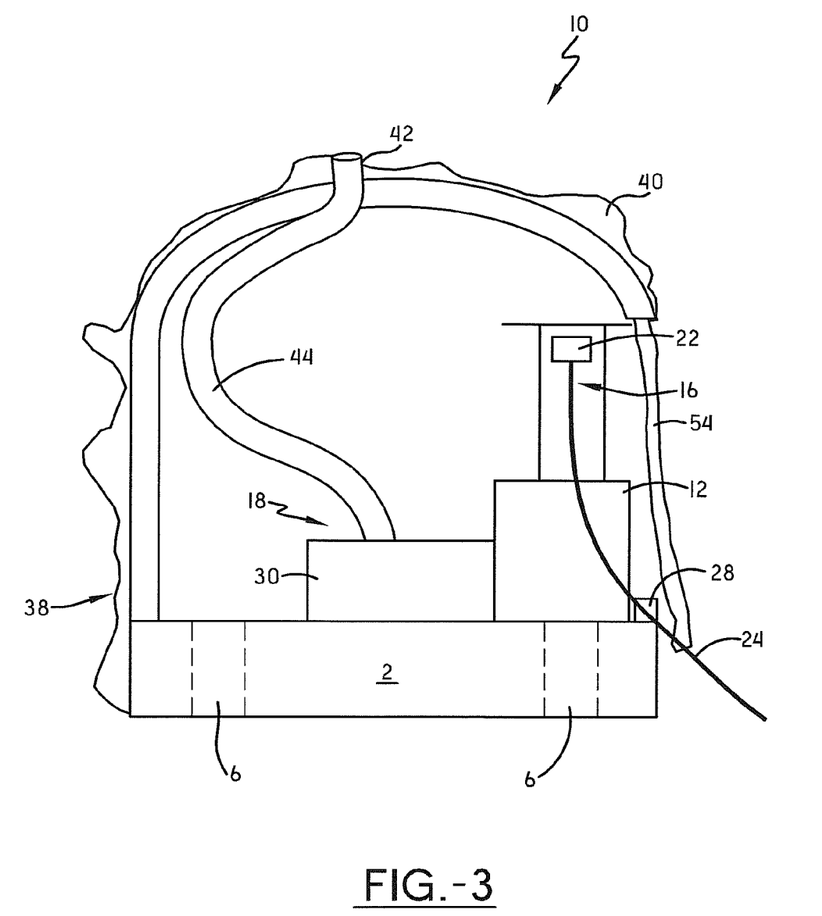
FIG. 3 shows a cross-sectional view of the mechanical scrape making device including a casing according to one embodiment of the invention.

With continued reference now to FIGS. 1 and 4, the scent dispenser 18 may comprise a reservoir 30 suitable for storing a quantity of fluid, such as deer scent or deer urine that is commercially available and well known to those of ordinary skill in the art, used during the operation of the MSMD 10. The operation of the pump 14 may cause the fluid to be urged from the reservoir 30 through a conduit 32 and into a channel 56 formed in the interior portion of the rake arm 22. In another embodiment, the channel 56 may comprise a conduit 56 that is attached to the exterior surface of the rake arm 22, as shown in FIG. 3. The fluid may then exit the channel 56 and dispensed onto the ground via a scent applicator 34. The scent applicator 34 may be attached to the rake arm 22. In one embodiment, the scent applicator 34 may extend from the rake arm 22 along the rake arm attachment 24. The scent applicator 34 may at least partially allow the fluid to be mixed into the ground by the contacting of the rake arm attachment 24 with the ground. In another embodiment, the scent dispenser 14 may comprise a plurality of reservoirs 30. Each of the reservoirs 30 may be filled with a different type of fluid, for example differing deer scents. The pump 14 may then dispense differing fluids during the operation of the MSMD 10. The pump 14 may dispense two or more differing fluids during a single operation of the MSMD 10, during subsequent operations of the MSMD 10, or both.

With reference now to FIG. 1, the MSMD 10 may comprise a base plate 2. The base plate 2 may comprise a weatherproof foundation for the MSMD 10. In one embodiment of the invention, the base plate 2 may comprise a substantially flat upper surface 4 suitable for receiving the components of the MSMD 10. In one embodiment, the power supply 20, the motor 12, and the pump 14 may be fixedly attached to the base plate 2. The base plate 2 may comprise any shape chosen with sound judgment by a person of ordinary skill in the art. The base plate 2 may comprise a ground stake access hole 6. The ground stake access hole 6 may comprise an aperture that extends through the base plate 2 and allows a ground stake 8 or similar device to be inserted through the ground stake access hole 6 for fastening the MSMD 10 to the ground. In one embodiment, the base plate 2 may comprise a plurality of ground stake access holes 6. The ground stake access holes 6 may be positioned on the base plate 2 such that upon insertion of the ground stake 8 through the ground stake access hole 6 and into the ground, the ground stake 8 substantially prevents the MSMD 10 from being moved, over-turned, or otherwise upset by passing animals or elements of nature. For example, the base plate 2 may comprise a ground stake access hole positioned at each of its ends and a ground stake access hole positioned substantially in the middle of the base plate 2. The base plate 2 may comprise any number of ground stake access holes 6 chosen with sound judgment by a person of ordinary skill in the art. The base plate 2 may comprise a pair of strap brackets 50. The strap brackets 50 may allow for the attachment of a carrying strap or sling, not shown, that assists the user in transporting the MSMD 10.

With reference now to FIG. 1, the MSMD 10 may comprise a timer 52 that allows for the programmable operation of the MSMD 10. The timer 52 may allow the user to selectively control the operation of the MSMD 10. In one embodiment, the user may program the timer 52 to cause the operation of the MSMD 10 to occur at predetermined intervals over a predetermined period. For example, the timer 52 may be able to be programmed to cause the operation of the MSMD 10 once every sixty (60) minutes over a period of twenty-four (24) hours. The timer 52 may cause the operation of the MSMD 10 to occur at predetermined intervals over a predetermined period by at least partially causing the operation of the motor 12. In one embodiment, the timer 52 may comprise a test mode that allows the operator to ensure or verify that the timer 52 is programmed to operate at the desired predetermined intervals and/or over the desired predetermined period.

With reference now to FIG. 3, the MSMD 10 may comprise a casing 38. The casing 38 may selectively attach to the base 2 to provide a substantially weatherproof enclosure for the MSMD 10. The casing 38 may be designed to at least partially camouflage the MSMD 10 within the particular environment that the MSMD 10 is to be utilized. In one embodiment, the casing 38 may be designed to be shaped substantially like a tree log or limb. The casing 38 may comprise a rake drape 54. The rake drape 54 may allow the rake 16 to move from a position within the casing 38 to a position external to the casing 38 without requiring the removal to the casing 38. In another embodiment, the casing 38 may comprise a camouflage jacket 40. The camouflage jacket 40 may be designed to at least partially camouflage the MSMD 10 within the particular environment that the MSMD 10 is to be utilized. In another embodiment, the casing 38 may comprise a plurality of interchangeable camouflage jackets 40, wherein each of the camouflage jackets 40 is designed to at least partially camouflage the MSMD 10 in a different particular environment or a particular season. The plurality of camouflage jackets 40 may allow the user to selectively interchange the specific camouflage jacket 40 used depending on the specific geographic environment and time of year. The casing 38 may also comprise a fill tube aperture 42. The fill tube aperture 42 may allow a user to fill the reservoir 30 without having to remove the casing 38 via a vented fill tube 44 extending between the reservoir 30 and the fill tube aperture 42.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A scrape making device comprising:
   a power supply, said power supply being a battery;
   a motor, said motor having a drive shaft;
   a pump assembly, said pump assembly having a pump;
   a scent dispenser for dispensing a fluid, said scent dispenser having a reservoir;
   a stationary base;
   a rake, said rake being driven directly by said drive shaft or said motor relative to said stationary base;
   said stationary base supporting said power supply, said motor, said pump, said scent dispenser and said rake;
   a casing;
   said power supply, said motor, said pump assembly, said scent dispenser and said stationary base all contained within said casing and,
   wherein said scrape making device is portable.

2. The scrape making device of claim 1, wherein the scent dispenser further comprises:
   a pump switch, wherein the pump switch allows for the selective control of the duration and timing of the operation of the pump.

3. The scrape making device of claim 1, wherein the rake further comprises:
   a rake arm; and,
   a rake arm attachment, wherein the movement of the rake arm at least partially causes the rake arm attachment to contact the ground to create the scrape.

4. The scrape making device of claim 3, wherein the rake further comprises:
   a rake arm stabilizer.

5. The scrape making device of claim 3, further comprising:
   a scent applicator, wherein the scent applicator extends from the rake arm and is in fluid communication with the scent dispenser.

6. The scrape making device of claim 1, further comprising:
   a timer, wherein the timer at least partially allows for the programmable operation of the scrape making device.

7. The scrape making device of claim 1, further comprising:
   a vented fill tube, wherein the vented fill tube at least partially allows the scent dispenser to be filled with the fluid while the scrape making device is substantially enclosed within the casing.

8. The scrape making device of claim 1, further comprising:
   an auxiliary port.

9. The scrape making device of claim 1, wherein the stationary base further comprises:
   a base plate for providing a weatherproof foundation and support for the scrape making device.

10. The scrape making device of claim 9, wherein the base plate further comprises:
    a ground stake access hole, wherein the ground stake access hole allows a stake to be used to fasten the scrape making device to the ground.

11. The scrape making device of claim 9,
    wherein the casing provides a substantially waterproof enclosure for the scrape making device and is selectively attachable to the base plate.

\* \* \* \* \*